US011312385B1

(12) United States Patent
Russo et al.

(10) Patent No.: US 11,312,385 B1
(45) Date of Patent: Apr. 26, 2022

(54) SYSTEM AND METHOD OF BADGING FOR DRIVER RISK ASSESSMENT

(71) Applicant: BLUEOWL, LLC, San Francisco, CA (US)

(72) Inventors: Micah Wind Russo, Oakland, CA (US); Theobolt N. Leung, San Francisco, CA (US); Gareth Finucane, San Francisco, CA (US); Eric Dahl, Newman Lake, WA (US)

(73) Assignee: BLUEOWL, LLC, San Francisco, CA (US)

( * ) Notice: Subject to any disclaimer, the term of this patent is extended or adjusted under 35 U.S.C. 154(b) by 232 days.

(21) Appl. No.: 16/203,236

(22) Filed: Nov. 28, 2018

(51) Int. Cl.
  *B60W 40/09* (2012.01)
  *G06F 16/9538* (2019.01)
  *G06Q 50/00* (2012.01)
  *G07C 5/00* (2006.01)

(52) U.S. Cl.
  CPC ......... *B60W 40/09* (2013.01); *G06F 16/9538* (2019.01); *G06Q 50/01* (2013.01); *G07C 5/008* (2013.01)

(58) Field of Classification Search
  None
  See application file for complete search history.

(56) References Cited

U.S. PATENT DOCUMENTS

| 8,577,703 | B2 * | 11/2013 | McClellan | G07C 5/08 |
| | | | | 705/7.11 |
| 9,386,447 | B2 * | 7/2016 | Tibbitts | H04M 1/72569 |
| 9,615,213 | B2 | 4/2017 | Tibbitts et al. | |
| 10,414,407 | B1 * | 9/2019 | Slusar | B60W 40/09 |
| 10,430,745 | B2 * | 10/2019 | Rani | G07C 5/0841 |
| 10,449,967 | B1 * | 10/2019 | Ferguson | H04L 67/12 |
| 10,565,593 | B1 * | 2/2020 | Aabram | G07F 17/0014 |
| 10,885,539 | B1 * | 1/2021 | Purgatorio | B60W 40/09 |
| 2002/0128882 | A1 * | 9/2002 | Nakagawa | G06Q 40/08 |
| | | | | 705/4 |
| 2012/0185282 | A1 * | 7/2012 | Gore | G06Q 30/02 |
| | | | | 705/4 |
| 2013/0316311 | A1 * | 11/2013 | England | G06Q 10/00 |
| | | | | 434/65 |
| 2014/0095305 | A1 * | 4/2014 | Armitage | G06Q 30/0251 |
| | | | | 705/14.49 |

(Continued)

*Primary Examiner* — Abdhesh K Jha
(74) *Attorney, Agent, or Firm* — Faegre Drinker Biddle & Reath LLP

(57) ABSTRACT

Systems and methods of utilizing badging for driver risk assessment are provided. Vehicle telematics data (e.g., speed data, acceleration data, braking data, cornering data, following distance data, turn signal data, seatbelt use data) associated with a vehicle operator may be analyzed. Based on the analysis, a trend of safe operation of the vehicle may be identified (e.g., based on a number of vehicle trips and/or a number of consecutive vehicle trips in which the vehicle telematics data indicates safe operation of the vehicle, a frequency of vehicle trips in which the vehicle telematics data indicates safe operation of the vehicle, a comparison to other drivers, etc.) A digital certificate indicating the trend of safe operation of the vehicle may be associated with the vehicle operator. In response to a third-party query regarding the vehicle operator, the digital certificate associated with the vehicle operator may be displayed to the third party.

20 Claims, 4 Drawing Sheets

(56) References Cited

U.S. PATENT DOCUMENTS

| | | | |
|---|---|---|---|
| 2014/0195272 A1 | 7/2014 | Sadiq et al. | |
| 2014/0278574 A1* | 9/2014 | Barber | B60W 40/09 |
| | | | 705/4 |
| 2014/0322676 A1 | 10/2014 | Raman | |
| 2015/0081404 A1* | 3/2015 | Basir | G06Q 30/0224 |
| | | | 705/14.1 |
| 2017/0098231 A1 | 4/2017 | Dietrich | |
| 2017/0206717 A1 | 7/2017 | Kuhnapfel | |
| 2020/0074492 A1* | 3/2020 | Scholl | B60K 35/00 |

* cited by examiner

SYSTEM AND METHOD OF BADGING FOR DRIVER RISK ASSESSMENT

FIELD OF THE DISCLOSURE

The present disclosure generally relates to vehicle safety and, more particularly, to systems and methods of utilizing badging for driver risk assessment.

BACKGROUND

Individuals have been operating vehicles as a means of transportation for decades. While in some instances in may be clear that some individuals operate their vehicles in an unsafe manner, e.g., based on records of crashes, arrests, tickets, or other citations associated with the vehicle operator, it may not be as clear which individuals consistently operate their vehicles safely.

SUMMARY

In one aspect, a computer-implemented method of utilizing badging for driver risk assessment is provided. The computer-implemented method includes analyzing, by a processor, vehicle telematics data associated with an operator of a vehicle, identifying, by a processor, based on the analyzing, a trend of safe operation of the vehicle, associating, by a processor, a digital certificate with the vehicle operator, the digital certificate indicating the trend of safe operation of the vehicle, receiving, by a processor, a third-party query regarding the vehicle operator, and displaying, by a processor, in response to the third-party query regarding the vehicle operator, the digital certificate associated with the vehicle operator.

In another aspect, a computer system for utilizing badging for driver risk assessment is provided. The computer system includes one or more processors and one or more memories. The one or more memories store instructions that, when executed by the one or more processors, cause the computer system to analyze vehicle telematics data associated with an operator of a vehicle, identify, based on the analysis, a trend of safe operation of the vehicle, associate a digital certificate with the vehicle operator, the digital certificate indicating the trend of safe operation of the vehicle, receive a third-party query regarding the vehicle operator, and display, in response to the third-party query regarding the vehicle operator, the digital certificate associated with the vehicle operator.

In still another aspect, a computer-readable storage medium for having stored thereon a set of instructions for utilizing badging for driver risk assessment is provided is provided. The set of instructions is executable by a processor. The instructions include analyzing vehicle telematics data associated with an operator of a vehicle, identifying, based on the analyzing, a trend of safe operation of the vehicle, associating a digital certificate with the vehicle operator, the digital certificate indicating the trend of safe operation of the vehicle, receiving a third-party query regarding the vehicle operator and displaying, in response to the third-party query regarding the vehicle operator, the digital certificate associated with the vehicle operator.

DETAILED DESCRIPTION

As discussed above, individuals have been operating vehicles as a means of transportation for decades. Generally speaking, it is useful to record whether individuals operate their vehicles safely or unsafely. However, while in some instances in may be clear which individuals operate their vehicles in an unsafe manner, e.g., based on records of crashes, arrests, tickets, or other citations associated with the vehicle operator, it may not be as clear which individuals operate their vehicles safely.

Systems and methods for utilizing badging for driver risk assessment are provided herein. For example, based on vehicle telematics data associated with a vehicle operator, trends of safe operation of a vehicle may be identified. Based on these trends of safe operation of the vehicle, a digital certificate (e.g., a badge) may be associated with the operator. These digital certificates may be displayed to third parties in response to third-party queries regarding the vehicle operator. For example, third parties may include, e.g., a business of which the vehicle operator is a customer or a potential customer, or a business of which the vehicle operator is an employee or potential employee. Accordingly, third parties may be made aware of the operator's trends of safe operation of the vehicle, and may accordingly distribute rewards, incentives, discounts, and/or access to certain selective programs or events to vehicle operators who operate their vehicles safely.

Figure 1A:
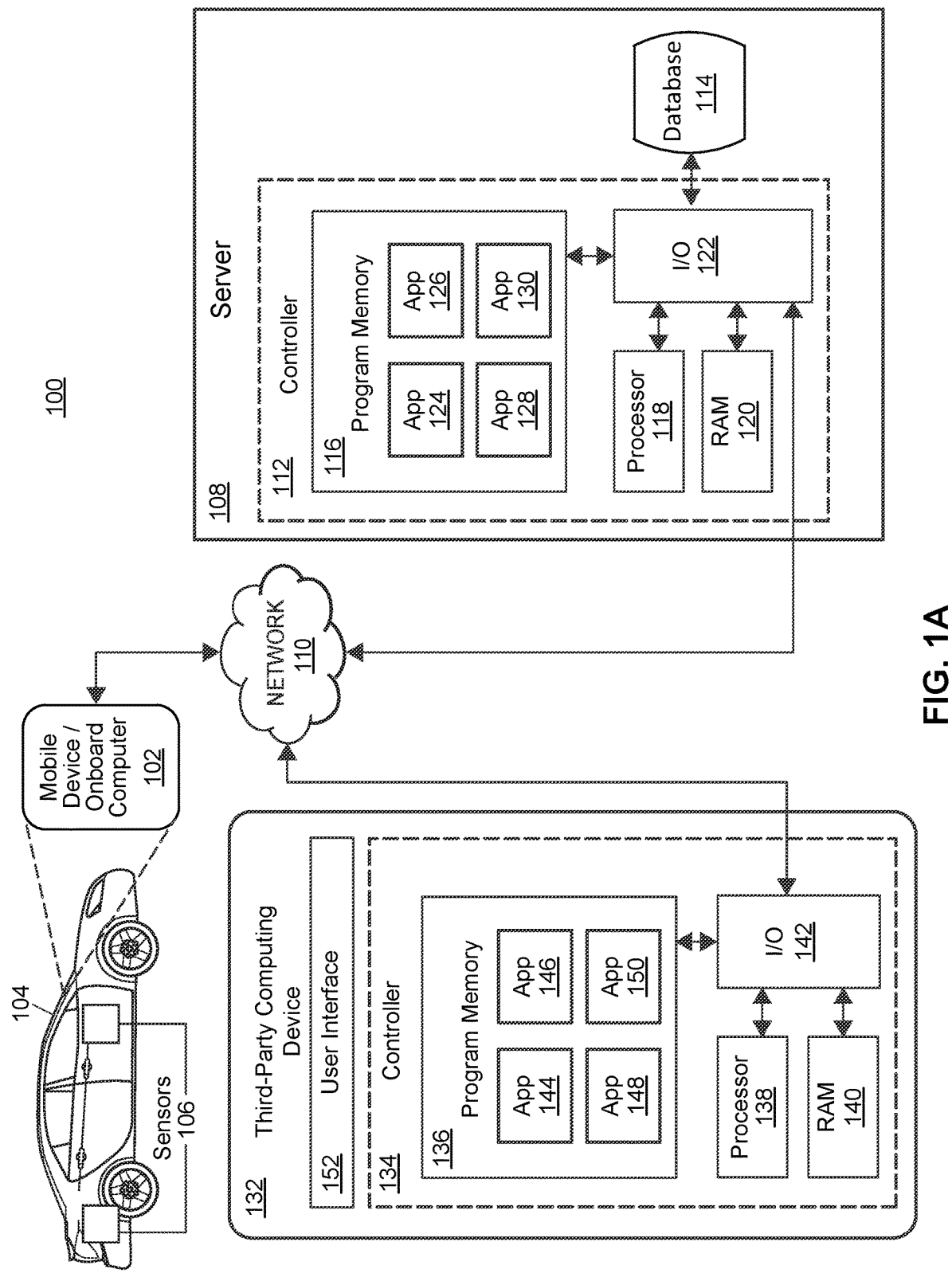
FIG. 1A illustrates an exemplary computer system for utilizing badging for driver risk assessment, in accordance with some embodiments.

Referring now to FIG. 1A, an exemplary computer system 100 for utilizing badging for driver risk assessment is illustrated, in accordance with some embodiments. The high-level architecture illustrated in FIG. 1A may include both hardware and software applications, as well as various data communications channels for communicating data between the various hardware and software components, as is described below.

As shown in FIG. 1A, a mobile device and/or on-board computer 102 (shown in greater detail at FIG. 1B) associated with a vehicle 104 (which may be, e.g., a car, a truck, a boat, a motorcycle, a motorized scooter, or any other vehicle) may interface with sensors 106, which may capture vehicle telematics data and other suitable data associated with the vehicle. The mobile device and/or on-board computer 102 may be configured to communicate the captured sensor data to a server 108 via a network 110. By analyzing this captured sensor data, the server 108 may identify certain trends of safe operation of the vehicle 104. The server 108 may associate one or more digital certificates (e.g., badges) with the operator (not shown) of the vehicle 104 based on the identified trends of safe operation of the vehicle 104. Upon receiving a third-party query regarding the vehicle operator (e.g., via the network 110), the server 108 may transmit these digital certificates to a third-party computing device 132 (e.g., via the network 110) for display via a user interface 152, e.g., as shown in FIG. 2A. Additionally, in some embodiments, upon receiving a request from the vehicle operator, the server 108 may post these digital certificates to a social media page associated with the vehicle operator, e.g., as shown in FIG. 2B.

As shown in FIG. 1A, the server 108 may include a controller 112 that may be operatively connected to the one or more databases 114 via a link, which may be a local or a remote link. The one or more databases 114 may be adapted to store data related to, for instance, vehicle telematics data associated with various vehicle operators, vehicle telematics data trends and/or thresholds indicating safe operation of a vehicle, various digital certificates indicating various trends of safe operation of the vehicle, digital certificates associated with various vehicle operators, third parties to which digital certificates may be transmitted, social media pages to which digital certificates may be posted, etc. It should be noted that, while not shown, additional databases may be linked to the controller 112. Additionally, separate databases may be used for various types of information, in some instances. Additional databases (not shown) may be communicatively connected to the server 108 via the network 110, such as e.g., third-party databases storing data related vehicle-related activities performed by various vehicle operators.

The controller 112 may include one or more program memories 116, one or more processors 118 (which may be, e.g., microcontrollers and/or microprocessors), one or more random-access memories (RAMs) 120, and an input/output (I/O) circuit 122, all of which may be interconnected via an address/data bus. Although the I/O circuit 122 is shown as a single block, it should be appreciated that the I/O circuit 122 may include a number of different types of I/O circuits. The program memory 116 and RAM 120 may be implemented as semiconductor memories, magnetically readable memories, optically readable memories, or biologically readable memories, for example. Generally speaking, the program memory 116 and/or the RAM 120 may respectively include one or more non-transitory, computer-readable storage media. The controller 112 may also be operatively connected to the network 110 via a link.

The server 108 may further include a number of various software applications 124, 126, 128, 130 stored in the program memory 116. Generally speaking, the applications may perform one or more functions related to, inter alia, analyzing vehicle telematics data associated with vehicle operators; identifying trends of safe operation of vehicles based on analyses of vehicle telematics data; associating digital certificates indicating certain trends of safe vehicle operation with certain vehicle operators; receiving third-party queries regarding vehicle operators; transmitting and/or displaying digital certificates associated with vehicle operators in response to third-party queries; posting digital certificates on social media pages in response to vehicle operator requests, etc. For example, one or more of the applications 124, 126, 128, 130 may perform at least a portion of any of the method 300 shown in FIG. 3. The various software applications 124, 126, 128, 130 may be executed on the same processor 126 or on different processors. Although four software applications 124, 126, 128, 130 are shown in FIG. 1A, it will be understood that there may be any number of software applications 124, 126, 128, 130. Further, two or more of the various applications 124, 126, 128, 130 may be integrated as an integral application, if desired.

It should be appreciated that although the server 108 is illustrated as a single device in FIG. 1A, one or more portions of the server 108 may be implemented as one or more storage devices that are physically co-located with the server 108, or as one or more storage devices utilizing different storage locations as a shared database structure (e.g. cloud storage). In some embodiments, the server 108 may be configured to perform any suitable portion of the processing functions remotely that have been outsourced by the on-board computer and/or mobile device 102.

Turning now to the third-party computing device 132, this computing device may include a user interface 152, as well as controller 134, which may include one or more program memories 136, one or more processors 138 (which may be, e.g., microcontrollers and/or microprocessors), one or more random-access memories (RAMs) 140, and an input/output (I/O) circuit 142, all of which may be interconnected via an address/data bus. Although the I/O circuit 142 is shown as a single block, it should be appreciated that the I/O circuit 142 may include a number of different types of I/O circuits. The program memory 136 and RAM 140 may be implemented as semiconductor memories, magnetically readable memories, optically readable memories, or biologically readable memories, for example. Generally speaking, the program memory 136 and/or the RAM 140 may respectively include one or more non-transitory, computer-readable storage media. The controller 134 may also be operatively connected to the network 110 via a link.

The third-party computing device 132 may further include a number of various software applications 144, 146, 148, 150 stored in the program memory 136. Generally speaking, the applications may perform one or more functions related to, inter alia, receiving a queries regarding vehicle operators from a third-party user, transmitting queries regarding vehicle operators to the server 108 (e.g., via the network 110), receiving digital certificates associated with vehicle operators from the server 108 (e.g., via the network 110), displaying digital certificates associated with vehicle operators (e.g., via the user interface 152), etc. For example, one or more of the applications 144, 146, 148, 150 may perform at least a portion of any of the method 300 shown in FIG. 3. The various software applications 144, 146, 148, 150 may be executed on the same processor 138 or on different processors 138. Although four software applications 144, 146, 148, 150 are shown in FIG. 1A, it will be understood that there may be any number of software applications 144, 146, 148, 150. Further, two or more of the various applications 144, 146, 148, 150 may be integrated as an integral application, if desired.

Figure 1B:
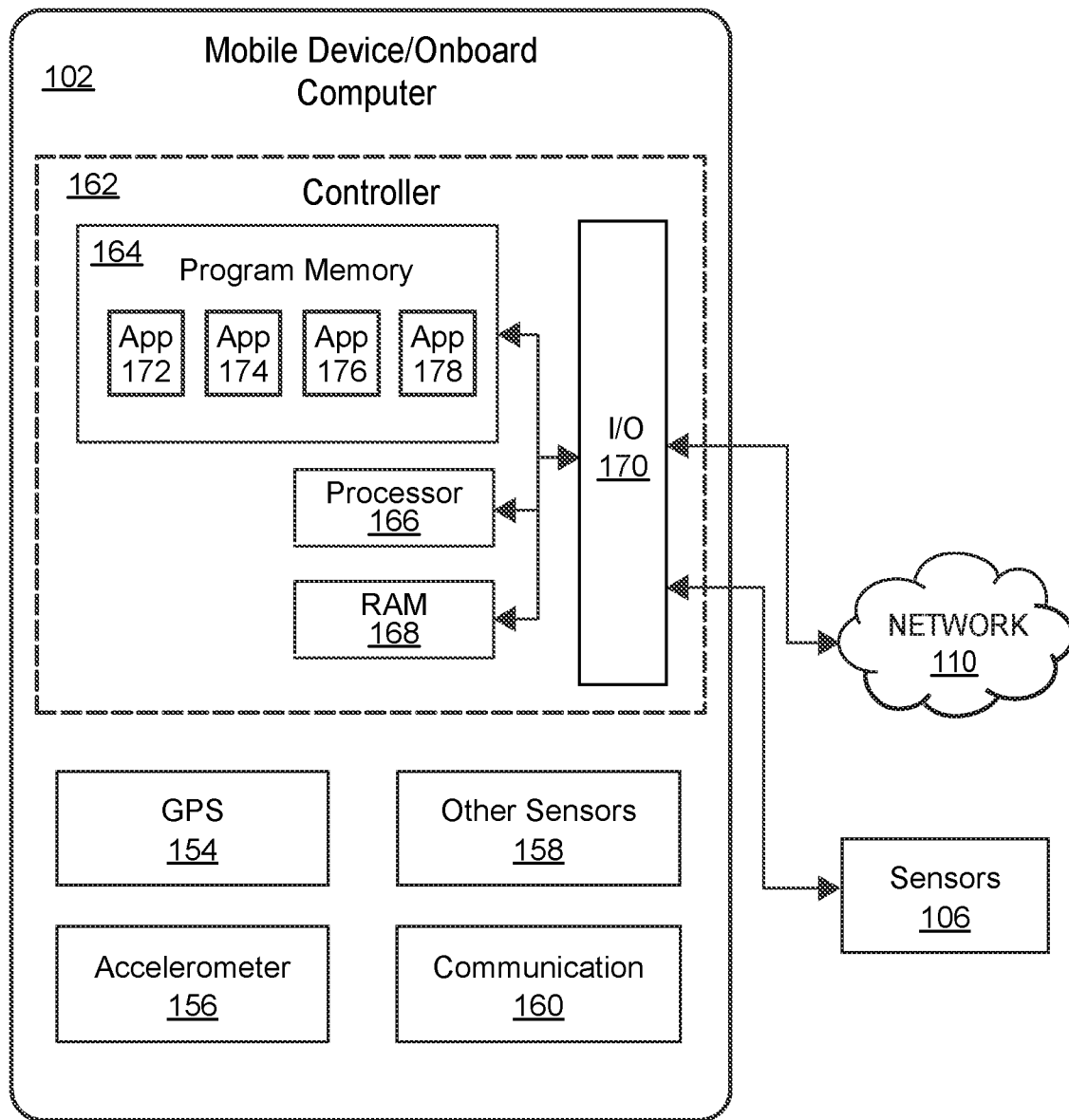
FIG. 1B illustrates an exemplary mobile device and/or onboard computer operable within the system of FIG. 1A, in accordance with some embodiments.
Figure 2A:
FIGS. 2A and 2B illustrate exemplary user interface displays for utilizing badging for driver risk assessment, in accordance with some embodiments.
Figure 2B:
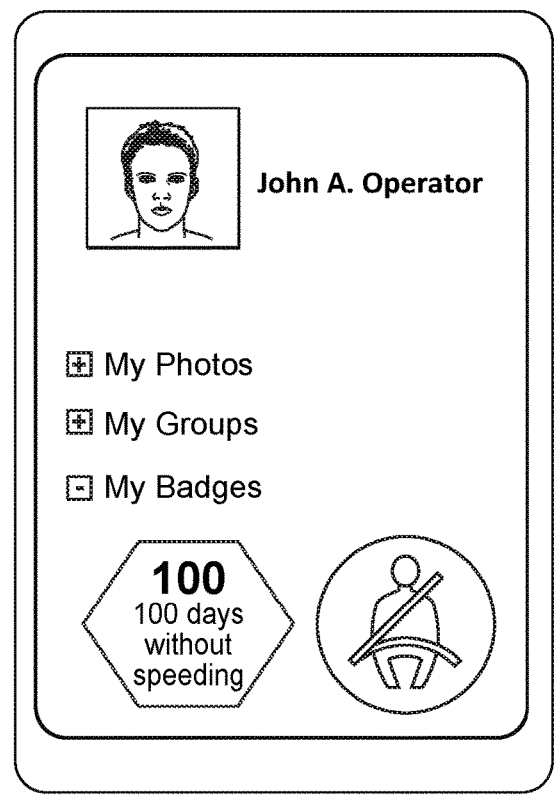

Referring now to FIG. 1B, the exemplary mobile device and/or onboard computer 102 associated with the vehicle 104 is illustrated in greater detail, in accordance with some embodiments. The mobile device and/or onboard computer 102 may include one or more of a GPS unit 154, an accelerometer 156, one or more other sensors 158, a communication unit 160, and/or a controller 162.

The GPS unit 154 may be disposed at the mobile device and/or onboard computer 102 and may collect data indicating the location of the mobile device and/or onboard computer 102, and/or (e.g., by proxy) the vehicle 104. Moreover, in some embodiments the GPS unit 140 may be a separate device disposed within or external to the vehicle 104 (e.g., one of the sensors 106), and interfacing with the mobile device and/or onboard computer 102. The accelerometer 156 may be disposed at the mobile device and/or onboard computer 102 and may collect data indicating the acceleration of the mobile device and/or onboard computer 102 and/or (e.g., by proxy) the vehicle 104. Moreover, in some embodiments the GPS unit 156 may be a separate device disposed within or external to the vehicle 104 (e.g., one of the sensors 106), and interfacing with the mobile device and/or onboard computer 102. In general, the GPS unit 154, an accelerometer 156, one or more other sensors 158, and the sensors 106 may be configured to capture vehicle telematics data associated with the vehicle 104, e.g., one or more of speed data, acceleration data, braking data, cornering data, object range distance data (e.g., following distance data), turn signal data, seatbelt use data, location data, phone use data, date/time data, weather data, road type data, or any other suitable vehicle telematics data. The communication unit 160 may be disposed at the mobile device and/or onboard computer 102 and may, e.g., transmit and receive information from external sources such as, e.g., the server 108 and/or the third-party computing device 132, e.g., via the network 110.

As shown in FIG. 1B, the mobile device and/or onboard computer 102 may include a controller 162 may include one or more program memories 164, one or more processors 166 (which may be, e.g., microcontrollers and/or microprocessors), one or more random-access memories (RAMs) 168, and an input/output (I/O) circuit 170, all of which may be interconnected via an address/data bus. Although the I/O circuit 170 is shown as a single block, it should be appreciated that the I/O circuit 170 may include a number of different types of I/O circuits. The program memory 164 and RAM 168 may be implemented as semiconductor memories, magnetically readable memories, optically readable memories, or biologically readable memories, for example. Generally speaking, the program memory 164 and/or the RAM 168 may respectively include one or more non-transitory, computer-readable storage media. The controller 162 may also be operatively connected to the network 110 via a link.

The mobile device and/or onboard computer 102 may further include a number of various software applications 172, 174, 176, 178 stored in the program memory 164. Generally speaking, the applications may perform one or more functions related to, inter alia, capturing vehicle telematics data associated with vehicle operators; transmitting the vehicle telematics data to the server 108, etc. For example, one or more of the applications 172, 174, 176, 178 may perform at least a portion of any of the method 300 shown in FIG. 3. The various software applications 172, 174, 176, 178 may be executed on the same processor 166 or on different processors. Although four software applications 172, 174, 176, 178 are shown in FIG. 1B, it will be understood that there may be any number of software applications 172, 174, 176, 178. Further, two or more of the various applications 172, 174, 176, 178 may be integrated as an integral application, if desired. Additionally, it should be appreciated that in some embodiments, the mobile device and/or onboard computer 102 may be configured to perform any suitable portion of the processing functions described as being performed by the server 108.

Referring now to FIGS. 2A and 2B, exemplary user interface displays for utilizing badging for driver risk assessment are illustrated, in accordance with some embodiments. FIG. 2A depicts an exemplary user interface display when a digital certificate associated with a vehicle operator is displayed to a third party (e.g., in response to the third-party query regarding the vehicle operator), in accordance with some embodiments. For example, the exemplary user interface display shown in FIG. 2A may be displayed via the user interface 152.

As shown in FIG. 2A, a third party, such as e.g., a car rental service, an insurance company, a potential employer, etc., may submit a query regarding a specific vehicle operator ("John A. Operator"). In response to the query, badges associated with the vehicle operator may be displayed. For example, as shown in FIG. 2A, John A. Operator's badges include a badge indicating a 100-day streak in which John A. Operator stayed within speed limits, and a badge indicating consistent seatbelt use. Of course, these are only examples of possible badges, and additional or alternative badges may be shown for various vehicle operators.

FIG. 2B depicts an exemplary user interface display when a digital certificate associated with a vehicle operator is posted to a social media page associated with the vehicle operator (e.g., in response to a request by the vehicle operator), in accordance with some embodiments. For example, John A. Operator may request for his safe driving badges (indicating, as in FIG. 2A, a 100-day streak in which John A. Operator stayed within speed limits, and indicating John A. Operator's consistent seatbelt use) to be shown on his social media profile. Accordingly, these badges may be posted to his social media profile, and visible to other users.

Figure 3:
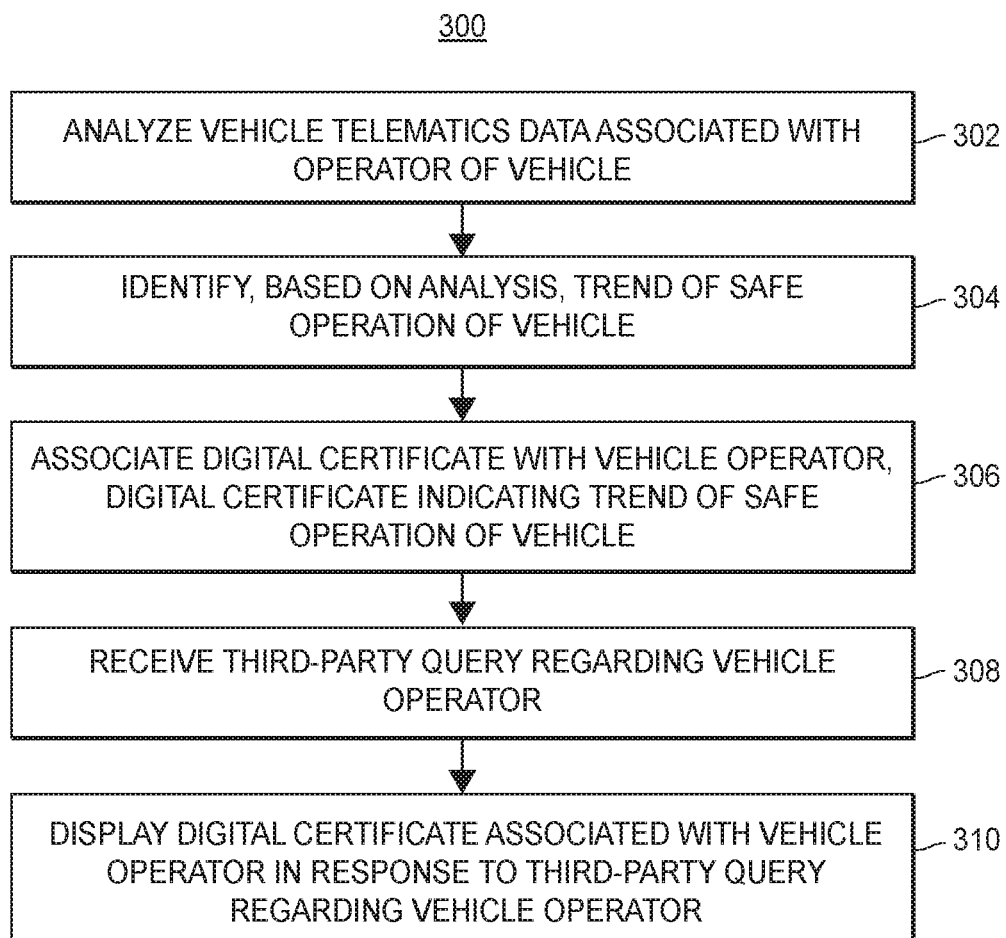
FIG. 3 illustrates a flow diagram of an exemplary computer-implemented method of utilizing badging for driver risk assessment, in accordance with some embodiments.

Referring now to FIG. 3, a flow diagram of an exemplary computer-implemented method 300 of utilizing badging for driver risk assessment is illustrated, in accordance with some embodiments. The method 300 can be implemented as a set of instructions stored on a computer-readable memory and executable on one or more processors.

Vehicle telematics data associated with an operator of a vehicle (e.g., vehicle 104) may be analyzed (block 302). The vehicle telematics data associated with the operator of the vehicle may include, for instance, speed data, acceleration data, braking data, cornering data, object range distance data (e.g., following distance data), turn signal data, seatbelt use data, location data, phone use data, date/time data, weather data, road type data, or any other suitable vehicle telematics data. This vehicle telematics data may be analyzed to determine instances in which the vehicle operator exhibits safe driving behaviors (as opposed to unsafe driving behaviors), and these instances of safe driving behavior may be recorded.

For instance, vehicle telematics data indicating that the speed of the vehicle is above a certain threshold speed may indicate an unsafe driving behavior, while vehicle telematics data indicating that the speed of the vehicle is below that speed may indicate a safe driving behavior. Similarly, for example, acceleration at a rate above a certain threshold rate may indicate an unsafe driving behavior, while acceleration below that threshold rate may indicate a safe driving behavior. As another example, braking data may be analyzed to determine instances of "hard" versus "soft" braking, with hard braking indicating an unsafe driving behavior while soft braking indicates a safe driving behavior.

In some instances, multiple types of vehicle telematics data may be combined to determine indications of safe and unsafe driving behavior by the vehicle operator. For example, location data may be combined with speed data to determine whether the vehicle operator is exceeding local speed limits (an unsafe driving behavior) or following them (a safe driving behavior). As another example, seatbelt use data may be combined with speed data to determine whether the vehicle operator is using a seatbelt while the vehicle is in motion (a safe driving behavior).

Based on the analysis, a trend of safe operation of the vehicle may be identified (block 304). For example, the trend of safe operation of the vehicle may be identified based on a number of vehicle trips in which the vehicle telematics data indicates safe operation of the vehicle, e.g., five trips in which all telematics data indicates safe operation of the vehicle, ten trips in which the seat belt is used while the vehicle is in motion, twenty trips in which the speed limit is obeyed, etc. As another example, the trend of safe operation of the vehicle may be identified based on a number of consecutive vehicle trips (e.g., a "streak" of trips) in which the vehicle telematics data indicates safe operation of the vehicle, e.g., five trips in a row in which all telematics data indicates safe operation of the vehicle, ten trips in which the brakes are used safely, twenty trips in a row in which the vehicle is accelerated safely, etc. As another example, the trend of safe operation of the vehicle may be identified based on a frequency of vehicle trips in which the vehicle telematics data indicates safe operation of the vehicle, e.g., in nine out of ten trips, all telematics data indicates safe operation of the vehicle, obeying the speed limit in 80% of all trips, proper use of turn signal in 95% percent of all trips, etc.

As an additional example, the trend of safe operation of the vehicle may be identified based on a duration of vehicle operation time (which may be calculated across multiple trips, e.g., two hours during a first trip and three hours during a second trip is five hours of vehicle operation time) during which the vehicle telematics data indicates safe operation of the vehicle, e.g., obeying the speed limit during ten hours of vehicle operation time, proper use of seat belts during fifty consecutive hours of vehicle operation time, etc. As still another example, the trend of safe operation of the vehicle may be identified based on a distance traveled by a vehicle (which may be calculated across multiple trips, e.g., 20 miles of driving and 30 miles of driving during a second trip is 50 miles total driven by a vehicle) during which the vehicle telematics data indicates safe operation of the vehicle, e.g., safe acceleration over 100 miles of driving, proper use of turn signals over 200 miles of driving, etc. As an additional example, the trend of safe operation of the vehicle may be identified based on a number of calendar days during which the vehicle telematics data indicates safe operation of the vehicle (e.g., safe cornering over 30 days, obeying speed limits for 7 days).

Moreover, in some examples, the trend of safe operation of the vehicle may be identified based on a comparison of the vehicle telematics data associated with the operator to vehicle telematics data associated with other operators, e.g., obeying the speed limit more frequently or more consistently than 90% of drivers, a greater number of trips in which the seat belt is used than other drivers, a longer streak of safe acceleration than other drivers, etc. In some instances, the vehicle operator's trend of safe operation of the vehicle may be identified based on a comparison to other similar vehicle operators, e.g., safest vehicle operator in a given city, top ten vehicle operator at obeying the speed limit in a certain age group, top 5% seatbelt user among drivers having the same make/model of vehicle, longest streak of safe cornering among drivers employed by the same company, etc.

Additionally or alternatively, an indication of a vehicle-related activity performed by the vehicle operator may be received, and the identification of the trend of safe operation of the vehicle may be based on the vehicle-related activity performed by the vehicle operator. The vehicle-related activity may be, for instance, a safe driving course, an oil change, a tire change, a vehicle maintenance check, a car wash, refueling the vehicle, replacing wiper blades, etc. For instance, the trend of safe operation of the vehicle may be a trend of receiving vehicle maintenance checks at regular intervals, a streak of refueling a vehicle when the fuel level falls below a certain threshold, a trend of consistently receiving high scores in safe driving courses, etc.

A digital certificate indicating the trend of safe operation of the vehicle may be associated with the vehicle operator (block 306). For example, the digital certificate may be a badge graphic including words or symbols indicating the trend of safe operation of the vehicle. For instance, a badge indicating a "streak" may include a number of days or trips in the streak, e.g., a number "10" in the badge graphic for ten trips in a row without speeding. As another example, a badge related to seatbelt use may include an image of a seatbelt.

In some examples, the digital certificate may expire after a certain amount of time has passed since the trend of safe operation of the vehicle was last identified. For example, the digital certificate may expire one month after the trend of safe operation of the vehicle was last identified, one year after the trend of safe operation of the vehicle was last identified, etc. Upon expiration, the digital certificate may no longer be associated with the vehicle operator. Moreover, in some examples, the digital certificate may be revoked if the vehicle operator no longer operates the vehicle safely. That is, if a trend of safe operation of the vehicle is no longer identified, the digital certificate may no longer be associated with the vehicle operator.

A third-party query regarding the vehicle operator may be received (block 308). The third-party query may originate from a business of which the vehicle operator is a customer or a potential customer. For instance, a vehicle rental service from which the vehicle operator wishes to rent a vehicle may request to see the vehicle operator's badges. As another example, an insurance company may request to see the vehicle operator's badges. As still another example, the third-party query may originate from an employer or potential employer of the vehicle operator. For example, a potential employer considering the vehicle operator for a position involving driving, e.g., in the field of trucking, delivery, taxi or limo services, ridesharing services, etc., may request to see the vehicle operator's badges.

In response to the third-party query regarding the vehicle operator, the digital certificate associated with the vehicle operator may be displayed to the third party (block 310), e.g., as shown in FIG. 2A. In some examples, the third party may provide rewards, incentives, discounts, and/or access to certain selective programs or events to the vehicle operator based on the displayed badges. For instance, these rewards, incentives, discounts and/or access to certain selective programs or events may be provided based on a number of badges associated with the vehicle operator, or by certain specific badges associated with the vehicle operator. For example, the vehicle operator may receive a discount from a vehicle rental program based on obtaining fifty total badges. As another example, the vehicle operator may gain access to a selective program, e.g., an opportunity to rent new or rare vehicles, based on obtaining a particular badge, such as a badge indicating twenty consecutive trips in which speed limits were obeyed.

In some examples, the method 300 may additionally include posting the digital certificate to a social media page associated with the vehicle operator (e.g., based on a request by the vehicle operator), e.g., as shown in FIG. 2B. For example, the vehicle operator may wish to share badges indicating trends of safe driving with friends and family.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method of utilizing badging for driver risk assessment, comprising:
    analyzing, by one or more processors, vehicle telematics data associated with an operator of a vehicle;
    identifying, by the one or more processors, based on the analyzing, a trend of a specific safe operation of the vehicle, the specific safe operation including an operation of at least one selected from a group consisting of speed, acceleration, braking data, object range distance, turn signal, and seatbelt use;
    associating, by the one or more processors, a digital certificate with the vehicle operator, the digital certificate comprising certificate content of at least one selecting from a group consisting of a word, a symbol, and a badge graphic, the certificate content representing the trend of the specific safe operation of the vehicle;
    receiving, by the one or more processors, a third-party query regarding the vehicle operator from a third party;
    displaying, by the one or more processors, in response to the third-party query regarding the vehicle operator, the digital certificate associated with the vehicle operator; and
    receiving an incentive generated by the third party based on the displayed digital certificate, wherein the incentive comprises at least one of a discount, a reward, an incentive, and an access to a selective program.

2. The computer-implemented method of claim 1, wherein the vehicle telematics data associated with the operator of the vehicle includes at least one selected from a group consisting of: speed data, acceleration data, braking data, cornering data, object range distance data, turn signal data, seatbelt use data, location data, phone use data, weather data, and road type data.

3. The computer-implemented method of claim 1, wherein the trend of the specific safe operation of the vehicle is identified based on at least one selected from a group consisting of:
    a number of vehicle trips in which the vehicle telematics data indicates the specific safe operation of the vehicle;
    a frequency of vehicle trips in which the vehicle telematics data indicates safe operation of the vehicle;
    a number of consecutive vehicle trips in which the vehicle telematics data indicates the specific safe operation of the vehicle;
    a duration of vehicle operation time during which the vehicle telematics data indicates the specific safe operation of the vehicle;
    a distance traveled by the vehicle during which the vehicle telematics data indicates the specific safe operation of the vehicle; and
    a number of calendar days during which the vehicle telematics data indicates the specific safe operation of the vehicle.

4. The computer-implemented method of claim 1, wherein the trend of the specific safe operation of the vehicle is identified based on a comparison of the vehicle telematics data associated with the operator to vehicle telematics data associated with other operators.

5. The computer-implemented method of claim 1, further comprising:
    posting, by the one or more processors, in response to a request by the vehicle operator, the digital certificate to a social media page associated with the vehicle operator.

6. The computer-implemented method of claim 1, further comprising:
    receiving, by the one or more processors, an indication of a vehicle-related activity performed by the vehicle operator; wherein the trend of the specific safe operation of the vehicle is identified based additionally on the vehicle-related activity performed by the vehicle operator.

7. The computer-implemented method of claim 6, wherein the vehicle-related activity includes at least one selecting from a group consisting of: a safe driving course, an oil change, a tire change, a vehicle maintenance check, a car wash, refueling the vehicle, and replacing wiper blades.

8. The computer-implemented method of claim 1, further comprising: disassociating, by the one or more processors, the digital certificate with the vehicle operator based on at least one selected from a group consisting of:
    (i) a passage of a predetermined amount of time since the trend of the specific safe operation of the vehicle was last identified; and (ii) no longer identifying the trend of the specific safe operation of the vehicle.

9. A computer system for utilizing badging for driver risk assessment, comprising:
one or more processors; and
one or more memories storing instructions that, when executed by the one or more processors, cause the computer system to:
analyze vehicle telematics data associated with an operator of a vehicle;
identify, based on the analysis, a trend of a specific safe operation of the vehicle, the specific safe operation including an operation of at least one selected from a group consisting of speed, acceleration, braking data, object range distance, turn signal, and seatbelt use;
associate a digital certificate with the vehicle operator, the digital certificate comprising certificate content of at least one selecting from a group consisting of a word, a symbol, and a badge graphic, the certificate content representing the trend of the specific safe operation of the vehicle;
receive a third-party query regarding the vehicle operator from a third party;
display, in response to the third-party query regarding the vehicle operator, the digital certificate associated with the vehicle operator; and
receive an incentive generated by the third party based on the displayed digital certificate, wherein the incentive comprises at least one of a discount, a reward, an incentive, and an access to a selective program.

10. The computer system of claim 9, wherein the vehicle telematics data associated with the operator of the vehicle includes at least one selecting from a group consisting of: speed data, acceleration data, braking data, cornering data, object range distance data, turn signal data, seatbelt use data, location data, phone use data, weather data, and road type data.

11. The computer system of claim 9, wherein the trend of the specific safe operation of the vehicle is identified based on at least one selected from a group consisting of:
a number of vehicle trips in which the vehicle telematics data indicates the specific safe operation of the vehicle;
a frequency of vehicle trips in which the vehicle telematics data indicates safe operation of the vehicle;
a number of consecutive vehicle trips in which the vehicle telematics data indicates the specific safe operation of the vehicle;
a duration of vehicle operation time during which the vehicle telematics data indicates safe operation of the vehicle;
a distance traveled by the vehicle during which the vehicle telematics data indicates the specific safe operation of the vehicle; and
a number of calendar days during which the vehicle telematics data indicates the specific safe operation of the vehicle.

12. The computer system of claim 9, wherein the instructions, when executed by the one or more processors, cause the computer system to:
post, in response to a request by the vehicle operator, the digital certificate to a social media page associated with the vehicle operator.

13. The computer system of claim 9, wherein the instructions, when executed by the one or more processors, cause the computer system to:
receive an indication of a vehicle-related activity performed by the vehicle operator;
wherein the trend of the specific safe operation of the vehicle is identified based additionally on the vehicle-related activity performed by the vehicle operator.

14. The computer system of claim 13, wherein the vehicle-related activity includes at least one selecting from a group consisting of: a safe driving course, an oil change, a tire change, a vehicle maintenance check, a car wash, refueling the vehicle, and replacing wiper blades.

15. The computer system of claim 9, wherein the instructions, when executed by the one or more processors, cause the computer system to:
disassociate the digital certificate with the vehicle operator based on at least one selected from a group consisting of:
(i) a passage of a predetermined amount of time since the trend of the specific safe operation of the vehicle was last identified; and
(ii) no longer identifying the trend of the specific safe operation of the vehicle.

16. A non-transitory computer-readable storage medium having stored thereon a set of instructions for utilizing badging for driver risk assessment, executable by a processor, the instructions comprising:
analyzing vehicle telematics data associated with an operator of a vehicle;
identifying, based on the analyzing, a trend of a specific safe operation of the vehicle, the specific safe operation including an operation of at least one selected from a group consisting of speed, acceleration, braking, object range distance, turn signal, and seatbelt use;
associating a digital certificate with the vehicle operator, the digital certificate comprising certificate content of at least one selecting from a group consisting of a word, a symbol, and a badge graphic, the certificate content representing the trend of the specific safe operation of the vehicle;
receiving a third-party query regarding the vehicle operator from a third party;
displaying, in response to the third-party query regarding the vehicle operator, the digital certificate associated with the vehicle operator; and
receiving an incentive generated by the third party based on the displayed digital certificate, wherein the incentive comprises at least one of a discount, a reward, an incentive, and an access to a selective program.

17. The non-transitory computer-readable storage medium of claim 16, wherein the vehicle telematics data associated with the operator of the vehicle includes at least one selecting from a group consisting of: speed data, acceleration data, braking data, cornering data, object range distance data, turn signal data, seatbelt use data, location data, phone use data, weather data, and road type data.

18. The non-transitory computer-readable storage medium of claim 16, wherein the trend of safe operation of the vehicle is identified based on one or more of:
a number of vehicle trips in which the vehicle telematics data indicates the specific safe operation of the vehicle;
a frequency of vehicle trips in which the vehicle telematics data indicates the specific safe operation of the vehicle;
a number of consecutive vehicle trips in which the vehicle telematics data indicates the specific safe operation of the vehicle;

a duration of vehicle operation time during which the vehicle telematics data indicates the specific safe operation of the vehicle;

a distance traveled by the vehicle during which the vehicle telematics data indicates the specific safe operation of the vehicle; and a number of calendar days during which the vehicle telematics data indicates the specific safe operation of the vehicle.

19. The non-transitory computer-readable storage medium of claim 16, wherein the instructions comprise posting, in response to a request by the vehicle operator, the digital certificate to a social media page associated with the vehicle operator.

20. The non-transitory computer-readable storage medium of claim 16, wherein the instructions comprise disassociating the digital certificate with the vehicle operator based on at least one selecting from a group consisting of:

(i) a passage of a predetermined amount of time since the trend of the specific safe operation of the vehicle was last identified; and (ii) no longer identifying the trend of the specific safe operation of the vehicle.

\* \* \* \* \*